UNITED STATES PATENT OFFICE.

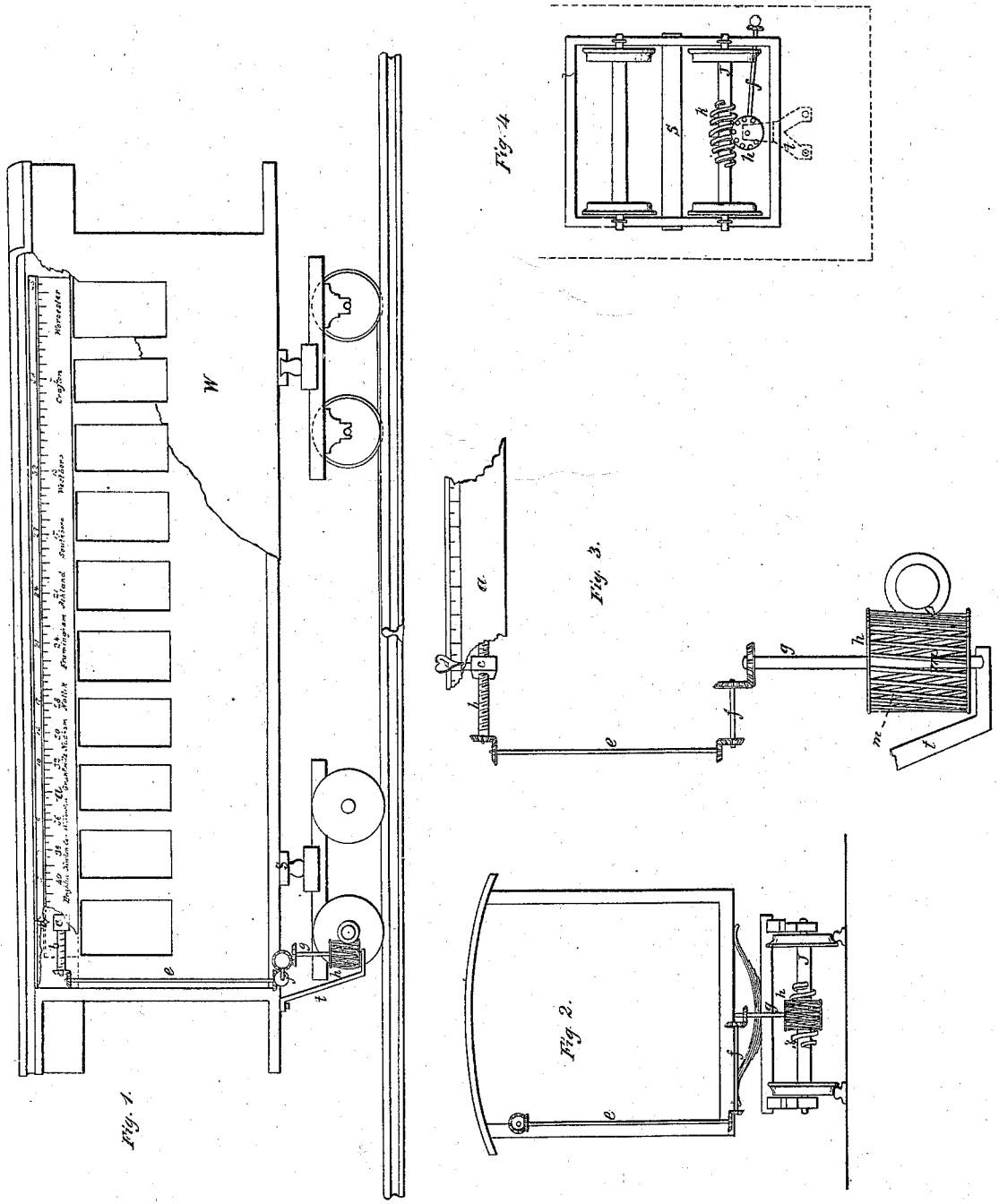
M. F. Potter.
Station Indicator.
No. 11,082.   Patented Jun. 13, 1854.

MERRITT F. POTTER, OF CHARLEMONT, MASSACHUSETTS.

RAILROAD-ODOMETER.

Specification of Letters Patent No. 11,082, dated June 13, 1854.

*To all whom it may concern:*

Be it known that I, MERRITT F. POTTER, of Charlemont, in the county of Franklin and State of Massachusetts, have invented a new and useful Machine for Denoting the Motion and Position of a Railway-Car upon its Truck, to be called "Potter's Railway-Odometer;" and I do hereby declare that the following is a full, clear, and exact description of the construction and operation of the same, reference being had to the annexed drawings, forming a part of this specification, of which—

Figure 1 is a perspective view, Fig. 2 an end view, Fig. 4 a view from beneath the car and Fig. 3 an enlarged view of the machine detached from the car, the same letters referring to similar parts.

W is a railway car with most of the front removed to show the interior.

$a$ is a scale within the car near the roof upon one side, on which is delineated a miniature profile of the road over which the car is to run, represented in miles and half miles. The Boston & Worcester railroad is the one here taken for illustration and each station is designated with its distance from either terminus; numbering from Boston above and from Worcester below the line.

Immediately behind the scale $a$, and extending its whole length is the screw $b$, having bearings upon each end to allow it to revolve upon its axis. Upon this screw, a small movable nut $c$ is placed. To this nut the index $d$ in front of the scale is attached. The screw $b$ receives its motion from the upright shaft $e$ by means of toothed wheels. The shaft $e$ is connected in like manner with the shaft $f$ beneath the car. Connected with the shaft $f$ is the upright shaft $g$, standing at right angles to the bottom of the car to which it is attached, and supported by the brace $t$ near one of the axles of the car. Upon the lower extremity of the shaft $g$ is fixed the pinion $h$, having teeth $m$ running downward in an oblique and slightly spiral direction. Upon the center of the axle $j$, is fixed an endless screw $k$, gearing in the pinion $h$. When the car is in motion, the endless screw $k$ turns the pinion $h$ one tooth for each revolution of the car wheel. This motion is conveyed through the shafts $g$, $f$, and $e$ to the screw $b$, causing it to revolve. The nut $c$ being connected with the index $d$ cannot revolve. It will therefore move upon the screw to the right or left according to the direction the car moves. The index $d$ being attached to the nut will move with it and indicate upon the scale the exact distance the car moves in miles and parts of a mile.

The distance which the index is to move in a mile will depend upon the length of the truck and can be regulated by the gearing upon the ends of the shafts. Thus: if the car is to go a great distance and it is necessary to give the index $d$ a very slow motion, I would connect the shafts $g$ and $f$ by the endless screw gear and the shafts $f$ and $e$ in like manner if necessary. When the motion of the car is reversed, the motion of the machine is reversed likewise; so that if the train should be switched backward upon another track, the index would move likewise and always indicate the position of the car. When the car has reached the end of the track the index will be at the corresponding end of the scale, and the return motion of the car will bring the index back again; its connection with the axle being such that it will move in either direction with equal facility and exactness.

The difficulty in connecting the gearing upon the car with that upon the axle, is owing to the varied movements of the car upon the trucks. This difficulty is, I believe completely obviated by the method of constructing and combining the pinion $h$ the screw $k$ and the axle $j$, which I will now briefly describe.

The pinion $h$ is liable to have four different motions. One of these only is produced by the endless screw $k$ by which the index $d$ is moved; viz., rotation upon its axis. The other three are derived from the car to which it is attached and have a disturbing influence. They are, 1st, the horizontal, 2nd, perpendicular, and, 3rd, rocking motion. The horizontal motion takes place in turning curves. The pinion $h$ then moves along the screw $k$ in a line not exactly parallel to it but in the arc of a circle whose center is the middle bearing $s$ of the car upon the trucks; the two having a motion like that of a curved rack and pinion. The danger would now be that the pinion $h$ would impinge upon the body of the screw $k$ as it approaches the extremity of the axle, or be thrown without the threads as it passes the middle. To avoid this danger I make the spaces between the threads deeper than would otherwise be necessary so that the teeth of the pinion $h$ may sink deeper between them as it approaches the extremity of its line of motion, thus giving room for motion of $h$ in the curve required. If the curve in the track should ever be found so short that this arrangement should not be efficient, I would make the middle of the screw more prominent, giving it a convexity parallel to the curve described by the pinion $h$ as shown in the upper half of the screw Fig. 4. To provide for the perpendicular motion the pinion $h$ is constructed so that its teeth $m$ shall exceed in length the distance the car can ever settle upon its springs. When the car is empty the lower portion of the pinion $h$ will articulate with the screw $k$. As the car settles the pinion $h$ will settle also, the upper portion of the teeth entering between the threads of the screw, and thus allow a free perpendicular motion without being thrown out of gear. 3rd. The rocking motion of the car has a tendency to embarrass the motion of the pinion $h$ by causing its teeth to bind upon the threads of the screw, thus creating great friction. This is obviated as follows—First, by constructing the teeth $m$ of the pinion $h$ with a downward obliquity parallel to that of the threads of the screw; 2nd, by making the spaces between the threads very much wider than the teeth of the pinion $h$ which they are intended to receive. This will allow the car sufficient rocking motion without causing any greater friction between the pinion $h$ and the screw $k$. By the construction and arrangement now described the pinion $h$ can make one or all of these 4 motions at the same time, viz., 1st, rotary on its axis from the revolution of the screw $k$; 2nd, horizontal, or rack and pinion motion in turning curves; 3rd; perpendicular motion upon its springs; 4th, rocking motion in running over inequalities in the track.

If the screw $b$ by which the index $d$ is moved should be found objectionable from its expense, an endless chain or a rack and pinion can be substituted for it. In place of the scale $a$ the track can be represented upon a dial in the end of the car. Behind the dial a toothed wheel might be placed to be moved by an endless screw upon the shaft $e$. The axle of the toothed wheel should project through the center of the dial in front, upon which I would place a revolving index.

I claim—

My method of constructing and combining the axle $j$, the screw $k$, and the pinion $h$, so as to transmit the motion from the car axle to the indicator, and at the same time admit of the various motions of the car upon its trucks, substantially as herein set forth.

MERRITT F. POTTER.

Witnesses:
CHANDLER CLARK,
LUTHER BODMAN, Jr.